(12) United States Patent
Ondrasik

(10) Patent No.: US 6,203,029 B1
(45) Date of Patent: Mar. 20, 2001

(54) NESTABLE FLAT BED CART

(76) Inventor: V. John Ondrasik, 6150 Shelia St., Los Angeles, CA (US) 90040-2407

( * ) Notice: Subject to any disclaimer, the term of this patent is extended or adjusted under 35 U.S.C. 154(b) by 0 days.

(21) Appl. No.: 09/081,000

(22) Filed: May 19, 1998

(51) Int. Cl.[7] .................................................. B62D 39/00
(52) U.S. Cl. ........................ 280/33.991; 280/47.12; 280/47.17; 280/47.34; 280/47.35; 280/79.11; 280/79.3
(58) Field of Search ........................... 280/33.991, 47.12, 280/47.17, 47.34, 79.11, 47.35, 79.3, 87.01

(56) References Cited

U.S. PATENT DOCUMENTS

| | | | | |
|---|---|---|---|---|
| 2,764,419 | * | 9/1956 | Enders | 280/79.11 |
| 2,903,269 | * | 9/1959 | Hennion | 280/47.35 |
| 2,918,294 | * | 12/1959 | Hennion | 280/47.35 |
| 3,224,787 | | 12/1965 | Andersen . | |
| 3,497,234 | | 2/1970 | Schray . | |
| 3,534,973 | * | 10/1970 | Elliott | 280/47.35 |
| 3,818,111 | * | 6/1974 | Ruger | 280/33.991 |
| 4,850,604 | * | 7/1989 | Marchand et al. | 280/79.3 |
| 5,299,816 | | 4/1994 | Vom Braucke et al. . | |
| 5,556,118 | * | 9/1996 | Kern et al. | 280/79.11 |
| 5,558,359 | * | 9/1996 | Phears | 280/79.3 |

FOREIGN PATENT DOCUMENTS

| | | |
|---|---|---|
| 0 352 647 | 1/1990 | (EP) . |
| 8500419 | 9/1986 | (NL) . |

* cited by examiner

*Primary Examiner*—Lanna Mai
*Assistant Examiner*—Toan To
(74) *Attorney, Agent, or Firm*—Brown, Martin, Haller & McClain

(57) ABSTRACT

A flat bed cart has a flat, wheeled platform with a front end and a rear end, and an upwardly extending handle frame extending upwardly from the rear end of the platform. The platform has a forward, fixed deck portion and a rear, liftable deck portion having a forward end hinged to the fixed deck portion for rotation about a first horizontal hinge axis extending transverse to the longitudinal axis of the platform. The rear deck portion is movable between a first position co-planar with the forward deck portion for use in transporting items supported on the platform, and a second, raised position when another cart is nested into the rear end of the platform.

9 Claims, 3 Drawing Sheets

NESTABLE FLAT BED CART

BACKGROUND OF THE INVENTION

The present invention relates to flat bed or platform carts in which a horizontal, wheeled bed or platform has a handle projecting upwardly from its rear end, and is particularly concerned with a nestable flat bed cart.

Flat bed or platform carts are used in stores such as hardware stores and the like selling relatively large items. Customers can readily place such items on the open, flat bed or platform of the cart in order to transport them to the cashier and then to their vehicles. One problem with flat bed carts is that they take up a considerable amount of storage space when not in use, and no effective arrangement for nesting such carts has been devised up to now.

In U.S. Pat. No. 5,299,816 of Vom Braucke et al., a platform cart is described in which the handle can be folded forwardly onto the platform for storage, and carts can be stacked on top of each other for storage. However, this is not particularly convenient when a cart is to be removed from its stacked condition, or for moving a stack of carts.

SUMMARY OF THE INVENTION

It is an object of the present invention to provide a new and improved flat bed cart which is nestable and has a flat and level deck portion or platform.

According to the present invention, a flat bed cart is provided which comprises a flat platform having a front end, a rear end, and a central longitudinal axis, a plurality of wheels supporting the platform, and an upwardly extending handle frame mounted at the rear end of the platform. The platform has a forward, fixed deck portion and rear, liftable deck portion having a forward end hinged to the fixed deck portion for rotation about a horizontal hinge axis extending transverse to the longitudinal axis of the platform, and a rear end which rests freely on a support bar in the handle frame.

When the forward end of a first cart is pushed into the rear end of a second cart, the liftable deck portion of the second cart will be lifted up to allow the fixed deck portion of the first cart to engage beneath the lifted deck portion. Another cart can then be nested into the rear end of the first cart in a similar manner. This will considerably reduce storage space requirements.

The fixed and liftable deck portions are preferably secured together by means of a double hinge mechanism, with an intermediate platform section between the fixed and liftable deck portions and secured to the respective deck portions by respective first and second parallel hinges. With this arrangement, the liftable deck portion is substantially horizontal when lifted by a second cart nested into the rear end of the platform. The arrangement is such that the deck or platform is flat and level when the cart is in use or not nested for storage.

In a preferred embodiment of the invention, the platform or bed of the cart has a rigid peripheral frame, preferably of tubular bar or rod construction, extending around the forward end and opposite sides of the platform, with the frame being open at the rear end of the cart for receiving the forward end of the platform of another cart. The opposite sides of the frame taper outwardly from the forward end to the rear end of the platform. Thus, the forward end of each platform is narrower than the rear end, so that it can be readily nested into the open rear end of the platform frame of another cart. The fixed and liftable deck portions are mounted in the frame and may be of wire mesh or other construction.

Preferably, the cart has a caster lifting portion beneath the platform for lifting up the front casters of a platform nested into the rear of the cart. This ensures that a row of nested carts can be pushed and steered from one place to another, since only the front, steering or swivel casters of the forward cart in the row will engage the ground for steering purposes.

The flat bed cart of this invention is easily nestable for storage, and nested carts can be readily separated as required for use. When a plurality of flat bed carts are nested together, they will take up significantly less storage space than would an equivalent number of non-nestable flat bed carts.

BRIEF DESCRIPTION OF THE DRAWINGS

The present invention will be better understood from the following detailed description of a preferred embodiment of the invention, taken in conjunction with the accompanying drawings in which like reference numerals refer to like parts and in which.

DESCRIPTION OF THE PREFERRED EMBODIMENT

Figure 1:
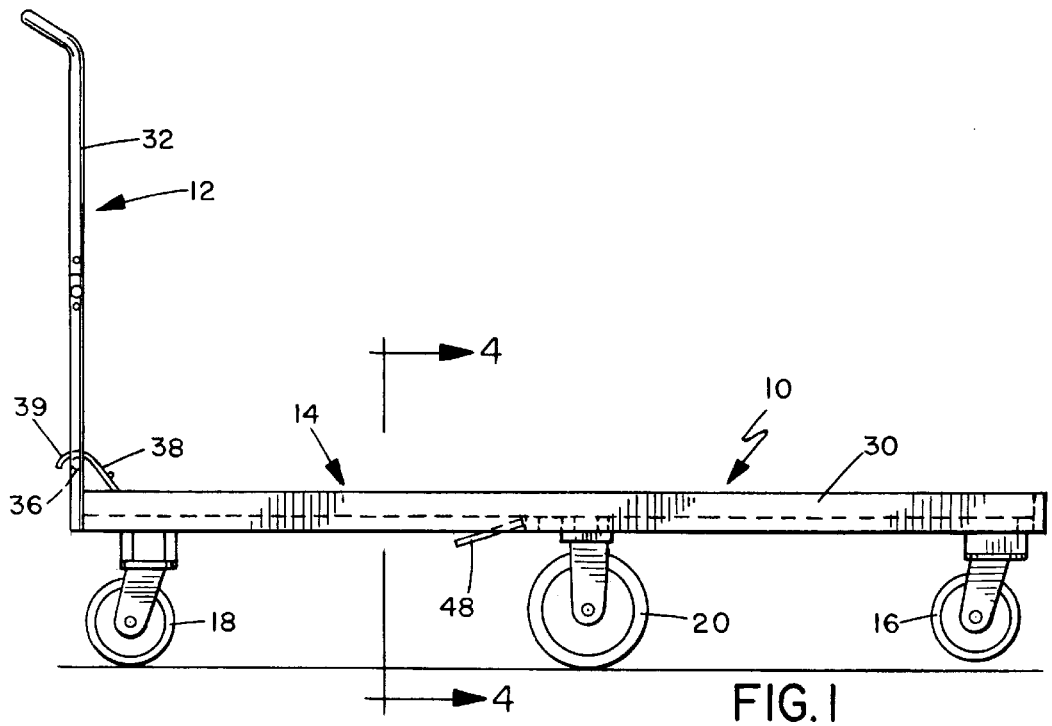
FIG. 1 is a side view of the flat bed cart according to a preferred embodiment of the invention.
Figure 2:
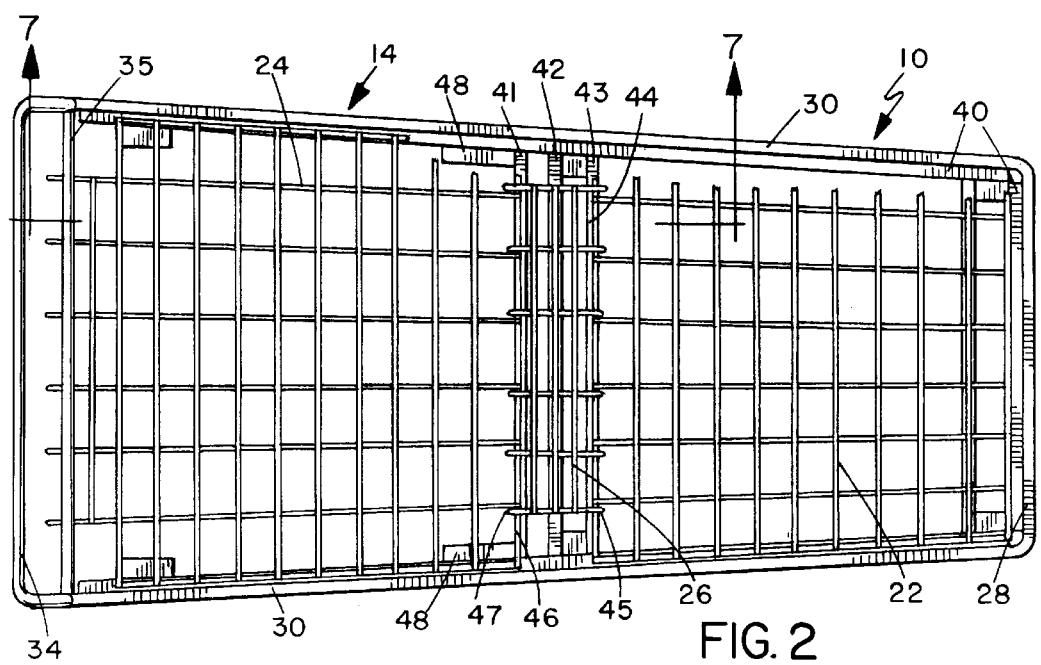
FIG. 2 is a top plan view of the cart.
Figure 3:
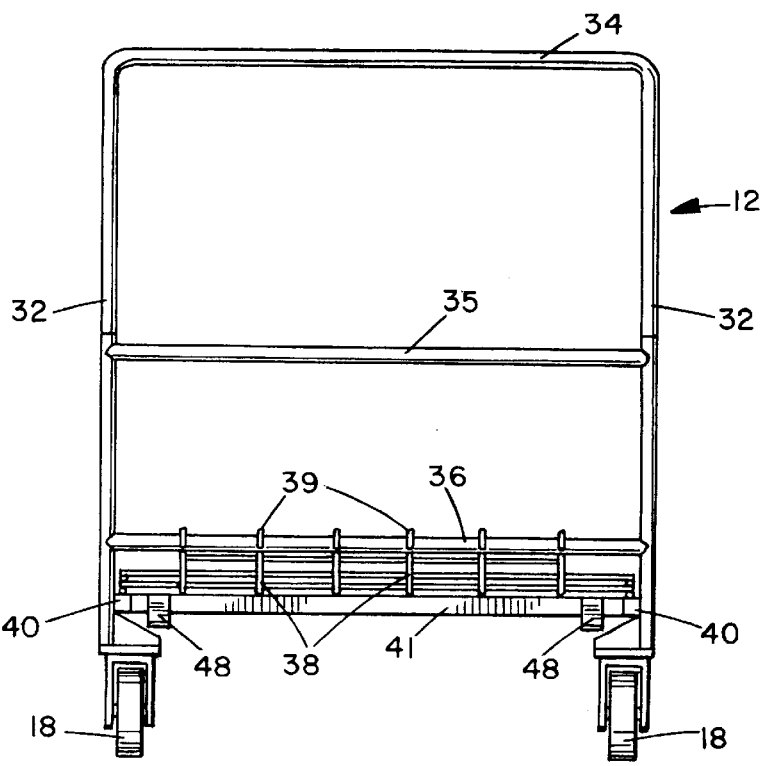
FIG. 3 is a rear end view of the cart, the middle and forward wheels being omitted for clarity.
Figure 4:
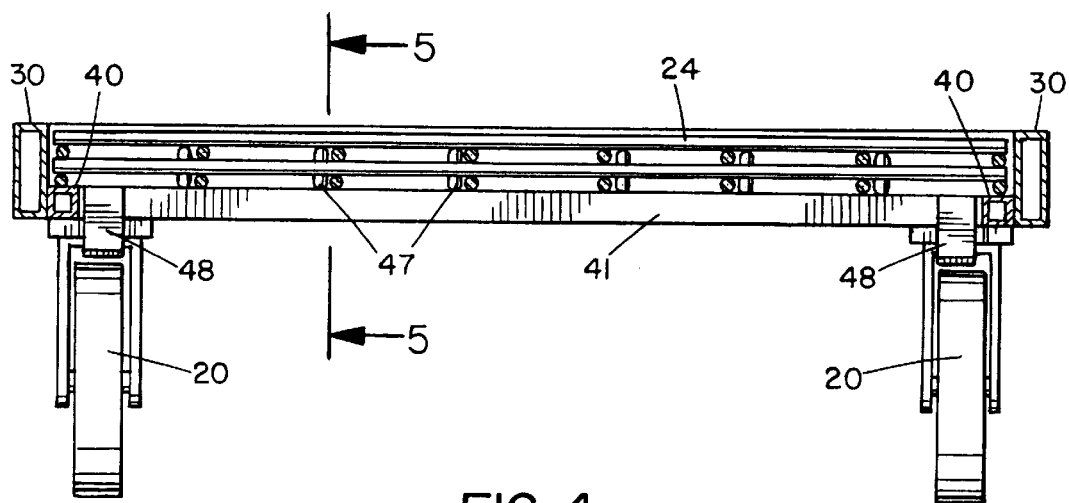
FIG. 4 is an enlarged sectional view taken on line 4—4 of FIG. 1.
Figure 5:
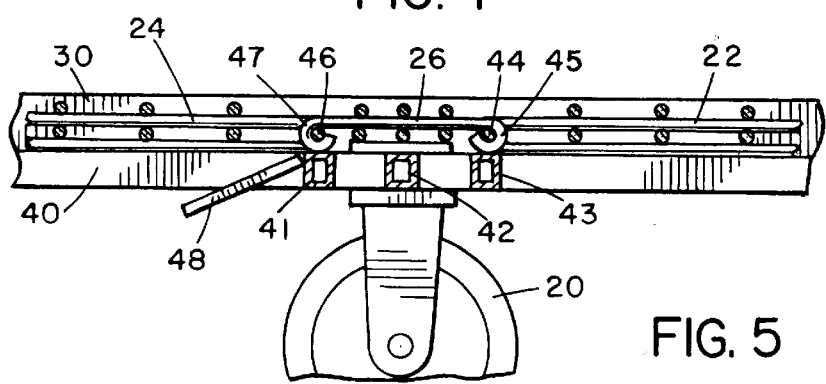
FIG. 5 is a sectional view taken on line 5—5 of FIG. 4.

As best illustrated in FIGS. 1 to 5, a flat bed or platform cart 10 according to a preferred embodiment of the present invention has an upright handle portion 12 at the rear end of the cart and a flat bed or platform 14 projecting forwardly from the lower end of the handle portion 12. Downwardly depending pairs of swivel casters 16, 18 are provided at the front and rear ends of the platform, respectively, and a pair of rigid, non-swivel casters or wheels 20 are provided at a central region of the platform. The platform 14 has a front, fixed section 22, a rear, liftable section 24, and a double hinged connecting section 26 between the front and rear sections, as best illustrated in FIGS. 2 and 5.

The platform 14 has a three-sided peripheral support frame having a front end 28 and opposite sides 30 which taper outwardly from the front to the rear of the platform, as best illustrated in FIGS. 1, 2, and 4. The frame is open at the rear end of the cart, and is formed from a tubular member of rectangular cross section, as best illustrated in FIG. 4. The free ends of sides 30 of the frame are suitably welded to the lower ends of a pair of upright members or rods 32 forming the sides of the handle portion 12. Rods 32 are secured together at their upper ends by handle bar 34. A pair of reinforcing cross bars 35, 36 are secured between the bars 34 at intermediate positions in their height, as illustrated in FIG. 3, with cross bar 36 being located adjacent the lower ends of rods 32. The liftable section 24 of the platform includes a rear, upwardly inclined or tilted portion 38 with a hook 39 at its rear end which engages over the lowermost cross bar 36 when the cart is in a non-nested condition, as indicated in FIGS. 1 and 3. Tilted portion 38 is preferably at an angle of around 45°, so that it may be engaged and lifted by the front end of a nesting cart, as explained in more detail below. The sections 22, 24, and 26 form a substantially flat and level platform when in the non-nested condition, as illustrated in FIG. 1.

Each section 22, 24, 26 of the platform is of double layer, wire grill construction, as illustrated in FIGS. 3 to 5. However, the platform may alternatively be of metal, plastic, or other material. A support ledge 40 for the platform sections is formed by a square-section bar welded to the inner face of the peripheral frame and extending around the sides 30 and front 28 of the frame, as illustrated in FIGS. 2 and 4. As indicated in FIG. 4, the peripheral side edges of the rear section 24, connecting section 26, and front section 22 rest on ledge 40, and the front edge of section 22 also rests on ledge 40 along the front of the platform. The front, fixed section is secured to the front end 28 and sides 30 of the peripheral support bar. The frame preferably includes cross bars 41, 42, 43 which extend between the opposite sides 30 of the support frame to provide support at the junction between the rear liftable section and connecting section, beneath the connecting section, and at the junction between the connecting section and front section, respectively, as illustrated in FIGS. 2, 4, and 5.

A first hinge or pivot rod 44 extends between sides 30 at the rear end of the front section 22. The connecting section 26 has a front end 45 pivotally or rotatably mounted on the first, fixed hinge rod 44, as illustrated in FIG. 5. A second hinge or pivot rod 46 is provided across the front end of the liftable rear platform section 24, and the rear end 47 of the connecting section is hinged or rotatably secured to rod 46. Fixed casters 20 are located beneath the center of connecting section 26.

An upwardly inclined lift ramp 48 is secured to each side 30 of the peripheral support frame of the platform, as illustrated in FIGS. 1, 2, 4 and 5. Each ramp 48 extends upwardly from a first location spaced rearwardly from the forward end of the liftable rear section 24 to a second location at the forward end, as best illustrated in FIG. 5.

Figure 6:
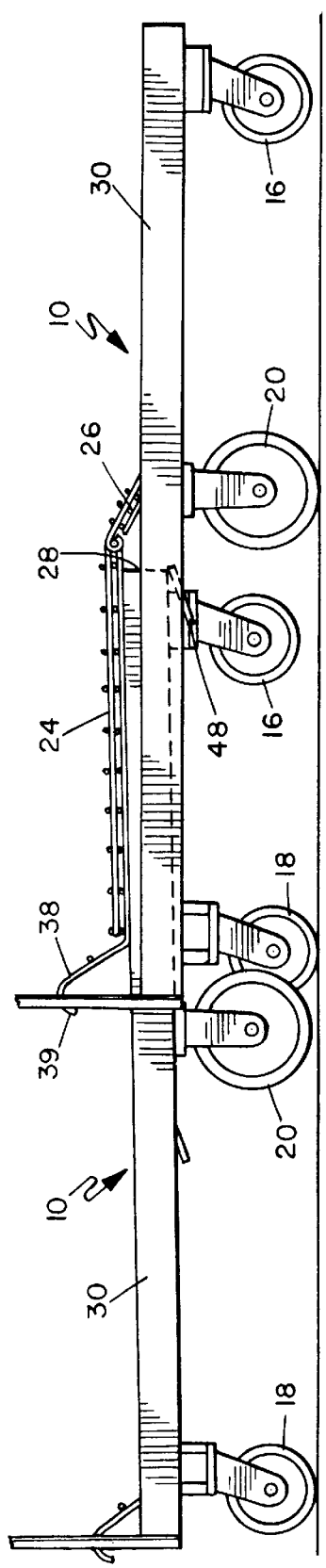
FIG. 6 is a side view showing two carts nested.
Figure 7:
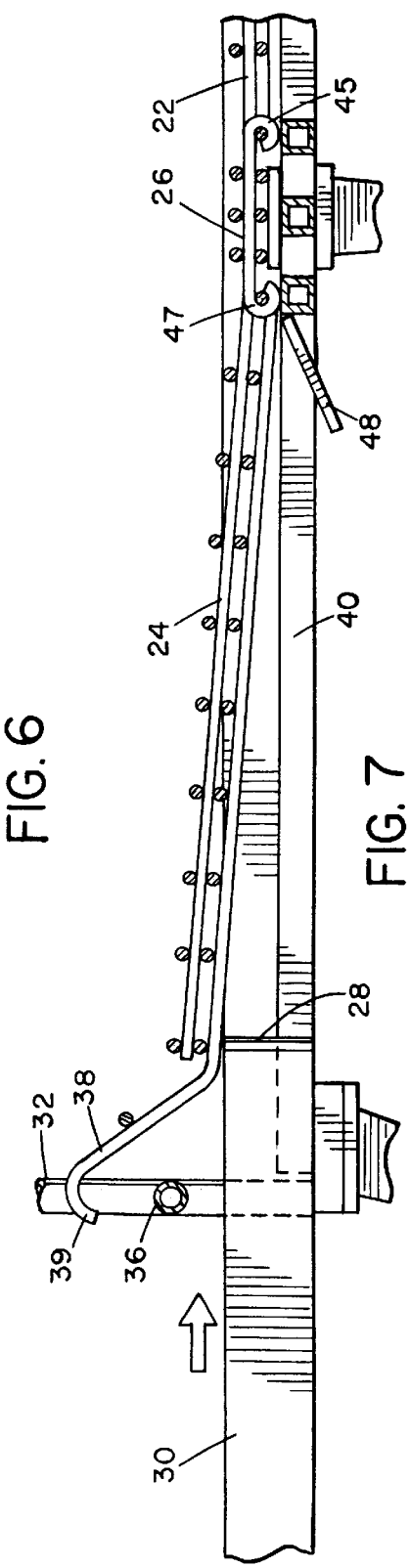
FIG. 7 is an enlarged sectional view taken on line 7—7 of FIG. 2, showing the initial insertion of a nesting cart.
Figure 8:
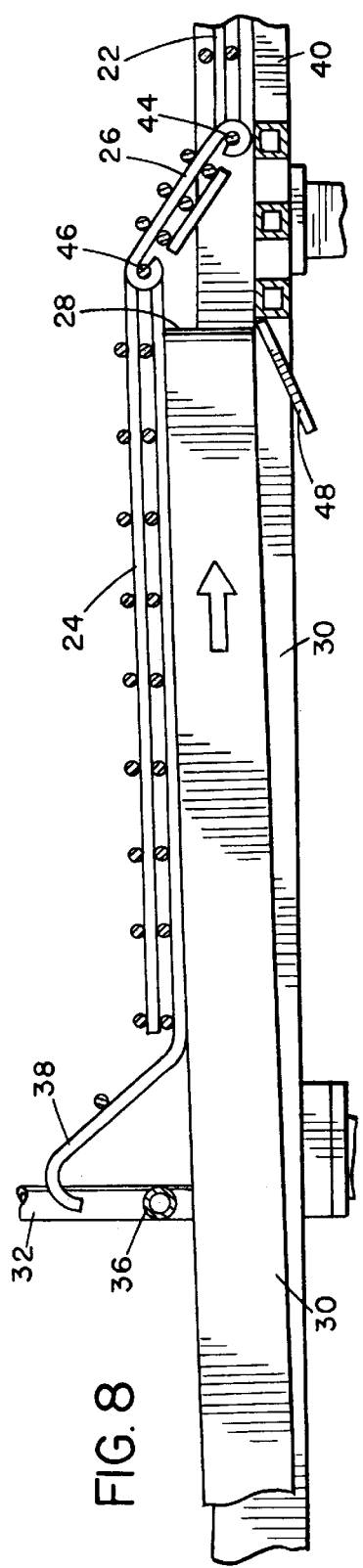
FIG. 8 is a view similar to FIG. 7, showing the carts fully nested.

As illustrated in FIG. 2, the width at the front end of the platform or flat bed is less than that at the rear end, and the rear end of the cart is open at the lower end of the handle portion. This allows the front end of a first cart to be pushed in at the rear end of a second cart, as illustrated in FIGS. 7 and 8. The front end 28 of the rear cart in FIG. 7 will first engage the inclined portion 38 of the liftable platform section 24 of the front cart, lifting the section 24 so that it rotates about hinge axis 46 into the initial raised inclined position indicated in FIG. 7. The hooked end 39 lifts up off cross bar 36 as indicated. As the forward section of the rear cart is pushed further in, the front end of the liftable section 24 will also lift up, and the connecting section 26 will pivot about both pivot axes 44 and 46 as indicated in FIG. 8 to accommodate the lifting of section 24 into a generally horizontal orientation. At the same time, the forward end 28 of the peripheral support frame of the first or rear cart will engage lift ramps 48 and will lift upwards, raising the front swivel casters 16 and the fixed casters 20 from the ground, as illustrated in FIG. 6. This allows the nested carts to be pushed as a unit. A further cart can be pushed in at the rear end of the first cart, and so on to nest a plurality of flat bed carts together.

This embodiment allows a plurality of flat bed or platform carts to be nested together for storage purposes, considerably reducing storage space requirements for such carts. Assuming the cart length is L, and the forward end portion of the platform nestable into another cart has a length of one half the cart length, then five carts nested together will have a length of 3L, whereas if the carts are not nestable they require a storage space length of 5L. For four wheel carts, a similar arrangement may allow the carts to be nested much closer together, since the double-hinge section may be located closer to the front end of the platform or deck.

The dimensions of the flat bed cart are similar to those of standard flat bed or platform carts, apart from the narrower front end and tapered sides of the bed, rather than a standard, rectangular platform. In one embodiment of the invention, the width across the front end of the platform was 25 inches, while the width across the rear end was 32.5 inches. The length of the platform was 62 inches. The connecting section 26 was located substantially at the center of the platform, so that approximately half the length of a cart can be nested into another cart. However, it will be understood that section 26 may be located closer to the front end of the cart if permitted by the wheel configuration.

The lifting ramps ensure that the fixed and front casters of each nested cart are raised from the ground, so that a line of nested carts can be readily maneuvered, for example from a parking lot back to a store. When flat bed carts are not nestable, they must be transported back into a store one or two at a time, which is a very time consuming procedure. With the cart of this invention, a plurality of carts can be nested and transported as a unit, considerably reducing employee time in recovery of such carts from a store parking lot.

Although a preferred embodiment of the invention has been described above by way of example only, it will be understood by those skilled in the field that modifications may be made to the disclosed embodiment without departing from the scope of the invention, which is defined by the appended claims.

I claim:

1. A flat bed cart, comprising:

a generally horizontal, flat platform having a front end, a rear end, opposite sides, and a central longitudinal axis;

a plurality of wheels supporting the platform in a horizontal orientation spaced above the ground;

an upwardly extending handle frame extending upwardly from the rear end of the platform;

the platform comprising a forward, fixed deck portion having a front end comprising the front end of the platform and a rear end spaced forwardly from the rear end of the platform and the handle frame, and a rear, liftable deck portion extending rearwardly and horizontally from the rear end of the fixed deck portion to the rear end of the platform, the liftable deck portion having a forward end hinged to the rear end of the fixed deck portion for rotation about a first horizontal hinge axis extending transverse to the longitudinal axis of the platform and a rear end comprising the rear end of the platform;

the rear deck portion being movable between a first position co-planar with the forward deck portion whereby the forward and rear deck portions together form a substantially flat, horizontal support surface for use in transporting items supported on the platform, and a second, raised position in which the rear end of the rear deck portion is raised upwardly to provide clearance for nesting when the front end of a platform of a similar cart is nested under the rear end of the platform; and a support structure for releasably supporting the rear deck portion in the first position.

2. The cart as claimed in claim 1, including a connecting portion extending between the rear end of the fixed deck portion and the front end of the liftable deck portion, the connecting portion having a forward end hinged to the rear end of the fixed deck portion about the first hinge axis, and a rear end hinged to the front end of the movable deck portion for rotation about a second hinge axis parallel to the first hinge axis to provide a double hinge device.

3. The cart as claimed in claim 1, wherein the platform has a peripheral support frame extending across the front end and along the opposite sides, the fixed deck portion being secured to the frame and the liftable deck portion being releasably supported on the frame.

4. The cart as claimed in claim 3, wherein opposite sides of the frame include a support ledge for supporting opposite sides of the liftable deck portion, the support ledge comprising said support structure.

5. The cart as claimed in claim 3, wherein the platform has a first width at the front end and a second width larger than the first width at the rear end, the opposite sides of the frame being tapered outwardly from the front end to the rear end of the platform for nesting engagement with the frame of a similar cart nested into the rear end of the platform.

6. The cart as claimed in claim 3, including a pair of inclined ramps secured to opposite sides of the peripheral frame of the platform beneath the forward end of the liftable deck portion to the rear of said first pivot axis, each ramp being inclined upwardly in a direction towards the front end of the platform, and comprising means for engaging and lifting the front end of a second cart nested into the rear of said cart, whereby only rear casters of the second cart are in contact with the ground while the carts are nested together and the two carts can be pushed together as a unit.

7. The cart as claimed in claim 1, wherein the liftable deck portion has a rear, upwardly inclined part having a hooked free end, and the handle frame includes a pair of spaced, upright bars and at least one cross bar extending between the bars adjacent the lower end of the frame, the hooked free end of the rear part of the liftable deck portion engaging over said cross bar when the liftable deck portion is in said first position, the cross bar comprising at least part of said support structure.

8. The cart as claimed in claim 7 wherein the upwardly inclined part is at an angle of 45° to the remainder of said liftable deck portion.

9. The cart as claimed in claim 1, wherein each of the deck portions has a length equal to approximately half the length of the platform.

* * * * *